United States Patent [19]

Hof et al.

[11] 4,397,570
[45] Aug. 9, 1983

[54] PRESSURE SENSITIVE ADHESIVE CONTAINING A NUCLEATING AGENT FOR USE IN A DISPOSABLE THERMOMETER

[75] Inventors: Craig R. Hof, Hopatcong; Roy A. Ulin, Wyckoff; Dennis Nickoloff, Lake Hiawatha, all of N.J.

[73] Assignee: PyMaH Corporation, Somerville, N.J.

[21] Appl. No.: 269,912

[22] Filed: Jun. 2, 1981

[51] Int. Cl.³ .................. C09K 3/00; G01K 11/16
[52] U.S. Cl. ................................. 374/162; 116/207; 252/408.1; 427/208.4
[58] Field of Search .................. 73/356; 116/207; 428/355; 427/208.4; 260/707, DIG. 35; 374/160, 161, 162

[56] References Cited

U.S. PATENT DOCUMENTS

| | | | |
|---|---|---|---|
| 2,728,687 | 12/1955 | Huerre | 428/356 |
| 2,750,314 | 6/1956 | Bemmels | 428/282 |
| 3,956,153 | 5/1976 | Chada | 116/207 X |
| 3,980,581 | 9/1976 | Godsey, Jr. et al. | 73/358 X |
| 4,145,321 | 3/1979 | Lee | 427/208.4 |
| 4,232,552 | 11/1980 | Hof et al. | 116/207 X |
| 4,248,762 | 2/1981 | Homibrook et al. | 427/208.4 X |
| 4,294,936 | 10/1981 | Korpman | 427/208.4 X |
| 4,299,727 | 11/1981 | Hof et al. | 252/408 |
| 4,313,986 | 2/1982 | Magnotta | 428/355 X |
| 4,328,269 | 5/1982 | Korpman | 428/355 X |
| 4,345,470 | 8/1982 | Hof et al. | 252/408 X |

OTHER PUBLICATIONS

Publication: Hackh's Chemical Dictionary, Julius Grant, 4th Edition, 1969, pp. 74–75, 80–81, 386–387, 502, 659, 325, 638.

Primary Examiner—Daniel M. Yasich
Attorney, Agent, or Firm—Charles A. Wendel; Robert H. Falk

[57] ABSTRACT

A new and useful composition of matter, solid at room temperature, is disclosed, comprising: (1) an effective amount of a suitable nucleating agent substantially uniformly dispersed in (2) a suitable pressure-sensitive adhesive for encapsulating a temperature-sensitive solid mixture having a given nucleation efficiency and which melts at a predetermined temperature, whereby the suitable nucleating agent is (a) inert to both the pressure-sensitive adhesive and the temperature-sensitive solid mixture, and (b) capable of raising the nucleation efficiency of said solid mixture. The novel composition of matter overcomes the extreme super-cooling achieved by temperature-indicating compositions of matter in U.S. Pat. No. 4,232,552 (which change color with a change in phase) without the use of classical nucleating agents being employed in such temperature-indicating compositions of matter. The novel adhesive composition of matter has been found to be especially suitable in conjunction with a preferred '552 temperature-indicating composition of matter comprising pinacyanol iodide dissolved in a solvent comprising ortho-chloronitrobenzene and ortho-bromonitrobenzene. An especially suitable novel adhesive of the instant invention comprises 0.5 to about 5.0 phr talc in polyisobutylene.

11 Claims, 6 Drawing Figures

— = unnucleated polyisobutylene adhesive contacting NTICM of 0.035 pinacyanol iodide / OCNB : OBNB --- = 1.5 phr talc nucleated polyisobutylene adhesive contacting NTICM of 0.035 pinacyanol iodide / OCNB : OBNB

FIG. I

EXAMPLES 3-4

EXAMPLE 5

PRESSURE SENSITIVE ADHESIVE CONTAINING A NUCLEATING AGENT FOR USE IN A DISPOSABLE THERMOMETER

RELATED APPLICATIONS

The instant application is related to the following copending applications: (1) Robert B. Polak, Roy A. Ulin, and Craig R. Hof, All PLASTIC DISPOSABLE THERMOMETER, U.S. Ser. No. 113,142, filed Feb. 1, 1980, now U.S. Pat. No. 4,345,470; and (2) Craig R. Hof, Concepcion Osio, and Roy A. Ulin, IMPROVED DISPOSABLE REVERSIBLE THERMOMETER, U.S. Ser. No. 104,411, filed Jan. 7, 1980, now U.S. Pat. No. 4,299,727, both incorporated herein by reference.

BACKGROUND TO THE INVENTION

1. Field of the Invention

This invention relates to the field of disposable thermometry, and, more particularly, the sub-fields of (1) the use of adhesives in disposable thermometry, and (2) the sub-field of materials used in conjunction with disposable thermometers containing temperature-indicating compositions of matter which change color with a change in phase.

2. Description of the Prior Art and Other Information

U.S. Pat. No. 4,232,552 to Hof and Ulin (not admitted as prior art hereto), incorporated herein by reference, disclosed a pioneer invention regarding novel and stable compositions of matter which change color sharply upon a transition from a liquid state to a solid state or from a solid state to a liquid state, which change of state is at substantially a predetermined temperature corresponding to a temperature to be measured. The constituents of the novel composition of matter comprise (1) a solvent (I) consisting of a single substance or a mixture of substances and adapted to change from a solid state at substantially a predetermined temperature to a liquid state, and (2) an indicator system (II) consisting of one or more substances different from (I), characterized in that:

(a) (II) is soluble in (I) when the latter is in the liquid phase, and (b) the novel composition of matter, including the indicator system (II), changes color visible to the naked eye when (I) passes from the solid to the liquid phase, or from the liquid phase to the solid phase. When the '552 invention is employed in disposable thermometry, a preferred embodiment uses a mixture of ortho-chloronitrobenzene and ortho-bromonitrobenzene as a solvent and 0.035 weight percent pinacyanol iodide (of the entire compositition) as a dye indicator. The various solvent mixtures of ortho-chloronitrobenzene and ortho-bromonitrobenzene are varied in order to obtain different melting points for the thermometer. The thermometer generally has the melting points spaced from 96.0° F. to 104.8° F. at 0.2° F. intervals (or 35.5° to 40.4° C. at 0.1° C. intervals). The '552 compositions are substantially free of impurities, and are capable of being supercooled for at least several minutes. An unforseen problem in the use of '552 compositions in disposable thermometry is that many of the compositions are supercoolable not just for minutes, but, incredibly, for days, if not weeks, at conditions above 32° F., i.e., household refrigerator conditions.

The use of heterogeneous nucleating agents to induce nucleation and crystallization of molten chemicals is well-known to those skilled in the classical opaque disposable thermometry art (see U.S. Pat. No. 3,980,581 to Godsey, Jr. et al. and U.S. Pat. No. 3,956,153 to Chadha), wherein a dye layer is employed beneath the solvent. Classical use of heterogeneous nucleating agents has been to employ the agents in the solvent of the temperature-sensitive mixtures, e.g., ortho-chloronitrobenzene and ortho-bromonitrobenzene used in such opaque thermometers manufactured prior to U.S. Pat. No. 4,232,552. For a review of the classicial thermometry art, see col. 1, line 40 to col. 6, line 19, of U.S. Pat. No. 4,232,552.

U.S. Pat. No. 4,189,942 to Giezen et al., incorporated herein by reference, discloses an opaque thermometer having a thermally conductive foil as a carrier layer, the carrier layer having one or more cavities formed by depression in the foil material. The depressions are filled with solid mixtures which melt at the predetermined temperatures and are composed of ortho-chloronitrobenzene, ortho-bromonitrobenzene and a dyestuff. The dyestuff is in a separate layer, and, when utilized, the Giezen et al. thermometer is non-reversible. A transparent layer cover seals the cavities and their contents. The transparent cover layer and carrier layer are bonded to each other by means of a pressure-sensitive adhesive which comprises polyisobutylene.

3. The Problem

Th surprising extreme lack of [reversibility] efficiency in the temperature-indicating compositions of matter of U.S. Pat. No. 4,232,552 poses a problem, inasmuch as it is desired to make the thermometers reversible in a short amount of time to those users in the hospital and the public who have access to only a common refrigerator, while, at the same time, maintaining the ability of the temperature-indicating compositions of matter to retain their supercooling properties for at least several minutes after the thermometer is used (otherwise, if the compositions were quickly reversed after use, i.e., withdrawal of the thermometer from the mouth, an accurate temperature reading could not be obtained).

4. An Invention

Surprisingly, in attempting to adapt the classical application of the heterogeneous nucleating agents in the temperature-indicating compositions of matter of U.S. Pat. No. 4,232,552, we have encountered some unforseen difficulties which severely restrict utility of prior art nucleating technology.

For example, the art as taught in Chadha, U.S. Pat. No. 3,956,153, is not operable in U.S. Pat. No. 4,232,552, because the Chadha nucleating agents taught therein are so efficient (i.e., raise the nucleation efficiency of the solid mixtures of the '552 compositions to such a degree) that stable supercooling at room temperature is not attainable, i.e., when the thermometer is drawn from the mouth, the compositions almost immediately revert back into solid form, making an accurate reading almost impossible. It is a requisite for use of the '552 temperature-indicating compositions of matter that they be supercoolable for at least several minutes, and this functional requirement is destroyed by use of the Chadha classical heterogeneous nucleating agents.

In Godsey, Jr. et al., U.S. Pat. No. 3,980,581, nucleating agents are taught which are substantially less efficient in inducing nucleation as to permit functioning of U.S. Pat. No. 4,232,552-type thermometers (e.g., TEMPA-DOT ® READY-STRIP ® thermometers sold by Organon Inc., West Orange, N.J.). An example of one such Gosey et al. nucleating agent is talc. These nucleating agents as taught in Godsey, Jr. et al. are heterogeneous in nature and insoluble in the liquid and solid phases of ortho-brominitrobenzene (OBNB):ortho-chloronitrobenzene (OCNB) based compositions. Unfortunately, the application of '581 insoluble nucleating agents to '552 disposable thermometers using state-of-the-art process machinery has presented additional problems deemed by us to be unsolvable. For example, if the powdered nucleating agent is sprinkled across the matrix of the thermometer in such a way as to insure that nucleating agents such as talc are contained in each pocket of the thermometer, the land areas between pockets on the carrier are invariably contaminated with the powdered nucleating agents. The contamination prevents effective bonding between the sealing member (i.e., adhesive of U.S. Pat. No. 4,189,942) and the thermometer base material. Furthermore, it has been found to be impractical to dispense these hard-to-handle powders in such a way that sufficient nucleating agent is contained in each pocket to induce nucleation at a specific temperature, while not adding so much that stable undercooling at room temperature is prevented. What was needed, then, was a nucleating agent and a means of applying same to the temperature-indicating compositions of matter of the '552 thermometer such that effective nucleation occurred at temperatures below room temperature (32° F. to about 50° F.), while the capacity of supercooling at room temperature was not substantially compromised such as to make the thermometer unworkable.

We found that a composition of matter, solid at room temperature, comprising:

(1) an effective amount of a suitable nucleating agent substantially uniformly dispersed in
(2) a suitable pressure-sensitive adhesive for encapsulating a temperature-sensitive solid mixture having a given nucleation efficiency and which melts at a predetermined temperature, whereby the suitable nucleating agent is (a) inert to both the pressure-sensitive adhesive and the temperature-sensitive solid mixture, and (b) capable of raising the nucleation efficiency of said solid mixture, solves the problem.

More particularly, we have discovered that when talc, $Mg_3(Si_4O_{10}(OH))_2$, is dispersed in a polyisobutylene (PIB) adhesive layer, and when this adhesive layer is used to seal the chemical pockets of a U.S. Pat. No. 4,232,552-style thermometer, that the regeneration of liquid pockets at temperatures from about 32° F. to about 50° F. is greatly enhanced when compared to similar thermometers in which the adhesive contains no talc. This is a surprising result to those skilled in the art. When a filler is incorporated in a polymer resin, it would not be expected to one skilled in the disposable thermometry art that one would find surfaces of the filler exposed at the surface of the polymer layer. Furthermore, as taught in Godsey, Jr. et al. above, intimate contact between the heterogeneous nucleating agent and the super-cooled melt are seen to be requirements for nucleation. Of course, the instant invention could be utilized not only for the novel temperature-indicating compositions of matter of U.S. Pat. No. 4,232,552, but also for the compositions employed in the classical, or opaque thermometers.

The invention has the added surprising benefit of reducing the complexity of manufacturing disposable thermometers when it is desired to use nucleating agents. This provides a significant reduction in the cost of manufacture over the addition of nucleating agents to the temperature-indicating compositions of matter sought by the prior art. Moreover, the mechanical problems of sprinkling or spraying the powdered classical nucleating agent on the molten area, freezing the temperature-sensitive materials and vacuum removing the dust have been avoided, together with the associated problems of attempting to make a uniform distribution of nucleating agents from pocket to pocket and from removing all the unwanted powder from the sealing surfaces.

SUMMARY OF THE INVENTION

While retaining the required property of the U.S. Pat. No. 4,232,552 temperature-indicating compositions of matter, that said compositions be capable of supercooling for at least several minutes, we have found that a novel adhesive composition that is solid at ambient temperature, comprising:

(1) an effective amount of a suitable nucleating agent substantially uniformly dispersed in
(2) a suitable pressure-sensitive adhesive for encapsulating a temperature-sensitive solid mixture having a given nucleation efficiency and which melts at a predetermined temperature, whereby the suitable nucleating agent (a) is inert to both the pressure-sensitive adhesive and the temperature-indicating compositions of matter mixture, and (b) is capable of raising the nucleation efficiency to said solid mixture, achieves the desired efficiency while avoiding the manufacturing problems, i.e., of making the '552 chemicals having controlled reversibility under "normal" household conditions, e.g., from about 32° F. to about 50° F. By nucleation "efficiency", we mean the rate of nucleation or recrystallization of the temperature-sensitive solid mixtures at any temperatures less than the melting point (see FIG. 1). While adaptable to opaque thermometers, we have found that the novel adhesive compositions of matter are especially adaptable when used in the '552 disposable thermometers having as a temperature-indicating composition of matter one which changes color sharply upon a transition from a liquid state to a solid or from a solid state to a liquid state capable of being supercooled for at least several minutes, and which change of state is at a substantially predetermined temperature corresponding to a temperature to be measured.

Moreover, the novel adhesive composition of matter is particularly adaptable to any temperature-indicating composition of matter comprising:

(A) a solvent (I) consisting of a single substance or mixture of substances and adapted to change from a solid state at substantially predetermined to a liquid state, and
(B) and indicator system (II) consisting of one or more substances different from (I) characterized in that:
  (1) (II) is soluble in (I) when the latter is in the liquid phase; and
  (2) the novel composition of matter, including the indicator system (II), changes color visible to the naked eye when (I) passes from the solid to the liquid phase or from the liquid to the solid phase.

Such are the compositions of U.S. Pat. No. 4,232,552. By "suitable pressure-sensitive adhesive", we mean any pressure sensitive adhesive suitable to encapsulate a temperature-sensitive solid mixture which melts at a predetermined temperature—e.g., all of those adhesives described and claimed in U.S. Pat. No. 4,189,942 (examples of such suitable pressure-sensitive adhesives are not only the '942 polyisobutylenes, but polyvinyl alcohol coated films and coating resins as known to those skilled in the art). Most preferably, the suitable pressure-sensitive adhesive is a '942 polyisobutylene.

A "suitable nucleating agent" may be any suitable nucleating material inert to a suitable pressure sensitive and to the temperature-sensitive compositions of matter which is capable of raising the minimum supercooling temperature. It is preferable, but not necessary, that the free energy of this suspended nucleation agent be low enough so that the particles tend not to grow less in the adhesive. Examples of such suitable nucleating agents are:

TABLE 1

| Talc (talcum powder) | $Mg_3(Si_4O_{10}(OH))_2$ |
|---|---|
| Howlite | $Ca_2(OH)_5B_5SiO_9$ |
| Titanite | $CaTiSiO_4$ |
| Guyana Bauxite (Gibbsite) | $Al(OH)Al(OH_3)$ |
| Arkansas Bauxite (Gibbsite) | $Al(OH)_{33}$ |
| Sepiolite | $H_4Mg_2Si_3O_{10}$ |
| Lepidolite, Purple | $KLi_2Al(FOH)_2$ |
| Stilbite | $Ca(Al_2SiO_{18}).7H_2O$ |
| Petalite | $LiAlSi_4O_{10}$ |
| Calcium aluminate | $CaAl_4O_7$ |
| Azurite | $Cu(CO_3)_2(OH)_2$ |
| Paisanite | $(SiO_2)_{.6-.75}(Na_2O)_{.12-.20}(CaO)_{.08-.2}$ |

Preferably, the suitable nucleating agent is talc. We have found a particularly synergistic adhesive composition of matter to employ polyisobutylene as the suitable pressure-sensitive adhesive and talc as the suitable nucleating agent, talc being in the amount of about 0.5 phr or to about 5.0 phr ("phr" is defined as parts per hundred of resin weights). Most preferably, the polyisobutylene is employed in a weight ratio to the polyisobutylene of about 3.0 phr.

We have found that a particularly suitable pressure-sensitive adhesive composition for use in disposable thermometry consists essentially of a mixture of OPPANOL TM B-15 polyisobutylene (average molecular weight 77,000–92,000), OPPANOL TM B-50 polyisobutylene (average molecular weight 340,000–480,000) and CHEVRON Polybutene 122 TM (viscosity of 3,000 to 3,400 centistokes at 100° C.) in a weight ratio of about 70 phr:15 phr:15 phr, respectfully. See Example 1.

The novel adhesive is especially suitable when employed in a disposable thermometer as taught by U.S. Pat. No. 4,232,552, wherein the temperature-indicating composition of matter is substantially free of impurities and consists essentially of a solid solution of:

(A) a binary mixture of ortho-chloronitrobenzene and ortho-bromonitrobenzene having a proportion of ortho-chloronitrobenzene to ortho-bromonitrobenzene of about 43.8:56.2 to about 4.0:96.0; and (B) an effective amount of pinacyanol iodide soluble in and inert towards said binary mixture (A) and adapted to change the color of the composition visible to the naked eye upon a change in state from a solid state to a liquid state at a predetermined temperature.

As taught in U.S. Pat. No. 4,232,552 for disposable thermometers, used in clinical applications, the amount of pinacyanol iodide employed is most preferably about 0.035 wt. % of the entire temperature-indicating composition of matter solid solution.

The invention also relates to a method for making the novel adhesive composition of matter. Generally, the method comprises:

(A) mixing an effective amount of a suitable nucleating agent in (1) a suitable pressure-sensitive adhesive for encapsulating a temperature-sensitive solid mixture, and (2) a solvent inert to and capable of dispersing said suitable nucleating agent in said suitable pressure-sensitive adhesive, for a time sufficient to effect a substantially uniform dispersion of said suitable nucleating agent in said suitable pressure sensitive adhesive; and (B) drying said mixture for a time sufficient to remove substantially all of said solvent.

Preferably, where the suitable pressure-sensitive adhesive is polyisobutylene and the suitable nucleating agent is talc, the drying step above is performed from about 280° F. to about 300° F. for about two minutes.

The novel adhesive composition of matter is best employed in a clinical disposable thermometer with a plastic carrier as described and claimed in copending U.S. Ser. No. 113,142, now U.S. Pat. No. 4,345,470, also incorporated herein by reference.

Such a '142 disposable thermometer device comprises:

(a) suitable non-metallic polymeric heat-conducting embossable flexible base layer means having one or more space cavities defined therein to determine a like number of predetermined temperatures in a predetermined temperature range, with a like number of different thermally responsive compositions of matter, said cavities, each thermally responsive composition of matter associated with one of the predetermined temperatures;

(B) suitable non-metallic sealant layer means in sealing engagement with the base layer means, overlying each of said cavities
to form a non-vented substantially vapor-impermeable enclosure for each cavity between the base layer walls and the floor of said cavity in the sealant layer means, wherein at least one of the base layer means and the sealant layer means is transparent.

For example, we can employ a carrier or substrate layer comprising a botton sublayer of PETRA ® AW amorphous polyethylene terephthalate (amorphous polyester-from Allied Chemicals, Morristown, N.J.) having a thickness of about 0.006–0.065 inches, adjacent to an intermediate pressure-sensitive acrylic adhesive sublayer (AROSET TM 1085 Z-45 by Ashland Chemicals, Colombus, Ohio), having a thickness of about 0.0005–0.001 inch. The adhesive is adjacent to a Nylon 6 top sublayer having a thickness of 0.002 inch. See Example 3 hereto. As an alternative, for a substrate layer comprising a bottom 0.006" sublayer of PETRA ® AW amorphous polyethylene terephthalate bonded (by a polyurethane laminating adhesive, POLYBOND SN TM 393C by Polymer Industries, Springdale, Conn.) to a composite coextrusion (top sublayer DuPont's SURLYN ® 1652, 0.002"; middle sublayer 0.001" of Nylon 6-Allied Chemical's CAPRAN ® 77C) produced by Pierson Industries, Holliston, Mass. See Example 5.

For an upper substrate layer in the cover means, we can use 0.00048 inches MYLAR ® polyester extrusion (MYLAR ® type A, E. I. DuPont de Nemours & Co. (Inc.), Wilmington, Del.), wherein the MYLAR ® is coated by a nitrogenous-containing melamine adhesive (AQUA-FORTE TM by A. D. M. Tronics, 153 Ludlow Ave., Northvalve, N.J.) with 0.001 inches of low-density polyethylene (Wraps, Inc., 810 Springdale Avenue, East Orange, N.J.). See Examples 3 and 5. Here, the PIB solution is applied afterwards to the low-density polyethylene surface in the usual manner. See Examples 6–7 of U.S. Ser. No. 113,142, now U.S. Pat. No. 4,345,470. The novel PIB solution with talc is made in accordance with the description herein.

BRIEF DESCRIPTION OF THE DRAWINGS

The subject matter which is regarded as the invention is set forth in the appended claims. The invention itself, however, together with further objects and advantages thereof, may be better understood by reference to the above and following description and Examples taken in conjunction with the accompanying drawings, wherein:

DESCRIPTIONS OF THE PREFERRED EMBODIMENTS

Figure 1:
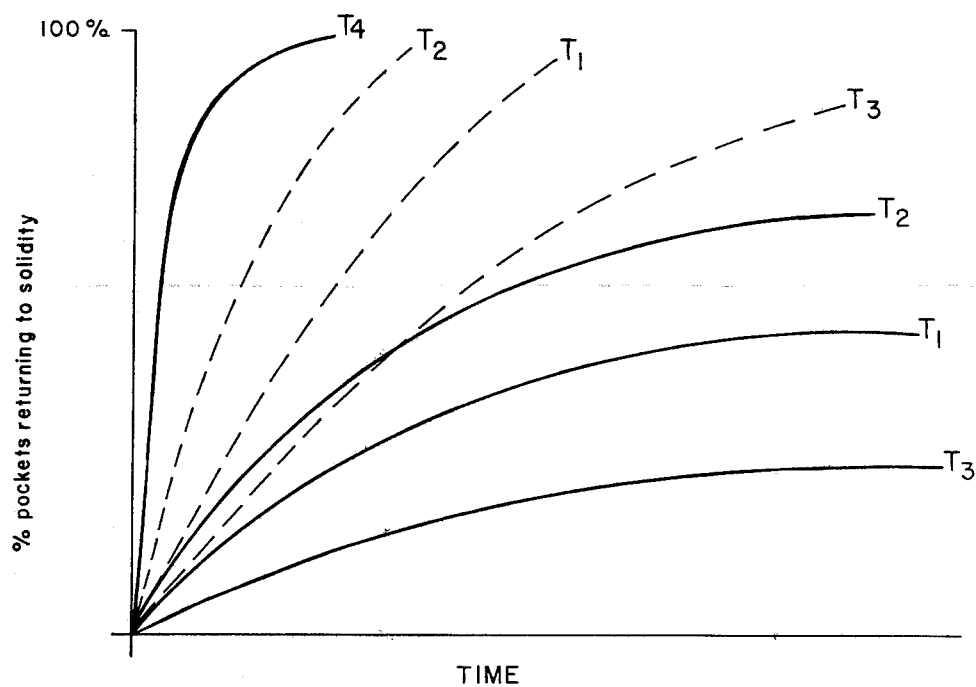
FIG. 1 is a graph (not scaled) illustrating the definition of "nucleation efficiency".

We have found various polyisobutylenes to be preferred materials for a suitable pressure-sensitive adhesive. It is preferred that the average molecular weight of the polyisobutylene should be in the range of 50,000 to 5,000,000. Average molecular weight is understood to be viscosity average molecular weight. This is calculated from the intrinsic viscosity, which, in turn, is determined from the rate of flow of a solution having a concentration of 1 g/dl in isooctane through the capillary of an Ubbelohde viscometer at a temperature of 20° C. For the calculation, the following formula is used:

$$[n] = n_{sp}/c/(1+0.31 N_{sp}) = 3.06 \times 10^{-4} \times \overline{M}_w \times 0.65$$

where:
[n] = intrinsic viscosity
$n_p = t/t_o - 1$ = specific viscosity
t = rate of flow of the solution, corrected in accordance with Hagenbach-Couette
$t_o$ = rate of flow of the solvent, corrected in accordance with Hagenbach-Couette
c = concentration of the solution in g/dl
$\overline{M}_w$ = average molecular weight Polyisobutylene having a relatively low average molecular weight of, for instance, below 150,000, has excellent adhesive strength. Under some circumstances, however, this material tends to accumulate in the indicator cavities as a result of viscous deformation.

In that case, it will be preferred to employ a polyisobutylene having a higher molecular weight, for instance, in the range of 150,000 to 4,000,000. As the adhesive strength decreases with increasing molecular weight, it will be of advantage to make use of a mixture of a low-molecular and a high-molecular weight polyisobutylene. On the one hand, such a mixture has good adhesive strength, and on the other hand, it is not subject to viscous deformation. In the preferably used mixture, 30–70% by weight of the polyisobutylene has an average molecular weight in the range of 70,000 to 100,000 and 70–30% an average molecular weight in the range of 1,000,000 to 3,500,000.

Particularly preferred is a mixture in which said components are present in practically equal parts by weight. The adhesive strength is further improved by choosing as carrier layer an aluminum foil whose adhesive side has a smooth surface which has previously been etched in a known manner to remove the oxide skin present on it. In order to further improve the adhesion between the carrier layer and the polyisobutylene adhesive layer, particularly with polyisobutylene having a relatively high molecular weight, the material of the carrier layer is previously provided with a thin surface layer of polyisobutylene whose average molecular weight is in the range of preferably 2,000,000 to 3,500,000. The most favorable results are obtained if such a layer has a thickness of from about 0.0005" to about 0.002", most preferably about 0.0012" to about 0.0015".

The bonding pressure applied is generally in the range of 1 to 50 kg/cm².

At this point, we would also like to disclose a preferred embodiment using a novel plastic thermometer of Ser. No. 113,142, now U.S. Pat. No. 4,345,470. This consists of a suitable substrate (base or cavity) layer upon which Nylon 6/LDPE Composite sealant layer has been applied. The Nylon 6/LDPE Composite layer may traverse the entire length of the substrate layer and be applied through conventional thermosetting adhesives (e.g., urethane) or it may be supplied as a narrow strip of nylon/LDPE Composite just long enough to cover the matrix area (see FIGS. 4–5) and held in place with the novel adhesive composition of our invention. The thermometer pockets are embossed into the substrate layer, and preferably a NTICM of 0.035 weight percent pinacyanol iodide in OCNB/OBNB is filled into each pocket. The adhesive layer is preferably a polyurethane laminating adhesive (e.g., POLYBOND SN ™ 393C by Polymer Industries, Springdale, Conn.) of a 0.0012 mil film. The novel adhesive consists of a blend of OPPANOL® B-15, OPPANOL® B-50, CHEVRON POLYBUTENE NO. 122 ™ (available from S & S Chemical Co., Inc., 445 Northern Boulevard, Great Neck, N.Y.), and Talc. The respective ratio of these components is 7.0:1.5:1.5. See Example 1. The OPPANOL® components can be supplied by BASF, D-6700 Ludwigshafen, Germany, or by BASF Wyandotte Corp., 491 Columbia Ave., Holland, Mich. 49423. A cover layer of MYLAR® type A (DuPont de Nemours & Co., Wilmington, Del.) of 0.0048" polyester extrusion bonded to a 0.001" layer of polyethylene is preferably employed by means of a nitrogenous melamine adhesive (e.g., AQUA-FORTE ™ 108 by A. D. M. Tronics, 53 Ludlow Avenue, Northvale, N.J.). The preferred embodiment may also use $CO_2$ blanket to cover the heat responsive chemicals in each pocket. See Example 3. This method is an effective way to remove substantially all the residual air from inside the pocket after the covering layer of tape has been applied to the top. Specifically, a stream of carbon dioxide is directed at the point where the top tape is laminated to the bottom web such that the pockets are substantially filled with carbon dioxide. Since the permeation rate of carbon dioxide is between 10 and 15 times that of nitrogen and oxygen, under existing pressure conditions, the carbon dioxide diffuses out of the pocket faster than the air or oxygen and nitrogen can diffuse in. The result is the creation of a partial vacuum inside which draws the adhesive and the top film down into the pocket. The result of this is a substantially full dot of color display. The $CO_2$ should be provided at about room temperature (25° C.), since if it is too cold, crystals of dry ice will form within the $CO_2$ gas lines and be deposited in the pockets and on the sealing surfaces of the thermometer. The $CO_2$ should be substantially pure and free of residues, such as oil. Impurities can affect the accuracy of the thermometer constituents.

The operation of embossing the pockets into the plastic substrate must be performed with consideration given to the effects of said operation upon the chemical (e.g., HSTICM, infra, if employed) retention shelf-life characteristics. This is particularly important when the substrate construction employs a thin (0.001–0.002 inch thick) layer of HSTICM barrier film such as Nylon 6.

After making the novel adhesive composition of Example 1, we prefer to heat the coated PIB solution during the manufacture of the thermometer until substantially all of the solvent is removed, which is about 280°–300° F. for about two minutes (utilizing a 60 ft. drying tunnel at which the thermometer tape is fed at 30 ft/min). Also, after the thermometer web is made, we further prefer to age it at 120° F. for 6–7 hours to improve the supercooling efficiency at room temperature when reading the thermometer.

It is to be noted that the novel thermometer of our invention can be used in at least two different manners: first, as an "opaque thermometer" by placing an opaque substance or numeral at the bottom of the cavity (which is displayed when a suitable solvent melts or "fires" at the temperature to be measured), or second, as a "HSTICM thermometer" using heat sensitive temperature indicating compositions of matter that turn color upon a change in phase. The latter alternative is preferred.

A novel temperature-indicating composition of matter (NTICM) of U.S. Pat. No. 4,232,552 is preferably employed as a HSTICM. Each NTICM composition exhibits a sharp color change upon transition from a liquid state to a solid state or from a solid state to a liquid state, is capable of being undercooled for at least several minutes, and is substantially free of impurities, and consists essentially of:

(a) a solvent adapted to change from a solid state to a liquid state at substantially a predetermined temperature; and (b) an effective amount of one or more suitable organic moieties dissolved in and inert towards said solvent to form a solid solution when the composition is in the solid state, and adapted to change the color of the composition visible to the naked eye upon the change in state at substantially the predetermined temperature when so dissolved, and selected from one of the groups consisting of:

(1) one or more of a Group III body of compounds consisting of pinacyanol iodide, 1,1'-diethyl-2,2'-cyanine iodide, quinaldine red, pinacyanol chloride, thionin, methylene blue, cresol red, chlorophenol red, neutral red iodide, neutral red chloride, crystal violet, Orasol Orange RLN TM, Orasol Navy Blue TM, Irgalith Red PR TM, Fat Red BS TM, Xylene Cyanol FF TM, Rhodamine B TM, Rhodamine 6G TM, Irgalith Magneta TCB TM, Irgalith Pink TYNC TM, Toluidine Blue O TM, Savinyl Green B TM, Savinyl Blue RS TM, purpurin, 3,3'-diethylthiadicarboxyanine iodide, cryptocyanine, Dicyanine A TM, Merocyanine 540 TM, 4-(p-ethoxyphenylazo)-m-phenylene diamine monohydrochloride, Yellow Orange S TM, Chrysoidan G TM, fuchsin, aurintricarboxylic acid (ammonium salt), Victoria Blue R TM, Pyronin G TM, gallein, Erythrosin Yellow Blend TM, chlorophenol blue, bromophenol blue, bromocresol purple, Coriphosphine O TM, acriflavine, acridin orange, rhoduline violet, Alizarin cyanin 2R TM, Alizarin Red S TM, alcannin, Aurantia, Direct Green G TM, Fast Red Salt 3GL TM, Fast Blue Salt BB TM, Fast Garnet Salt GBC TM, Carta Yellow G 180 o/o TM, Murexide, Savinyl blue GLS TM, Irgalith Blue GLSM TM, phthalocyanine, Di Amingreen B TM, Alizarin Blue S, Celliton Blue Extra TM, neocyanine, Janus Green TM, dimethyl yellow, Fast Yellow TM, methyl red sodium salt, Alizarin yellow R TM, Eriochrome black T TM, Chromotrope 2R TM, Ponceau 6R TM, Brilliant Ponceau G/R/2R, chromolan yellow, Sudan Red B TM, Bismarck brown G, Fat Black TM, Resorcin Brown TM, Benzofast pink 2BL TM, Oil Red EGN TM, Euroglaucine, Fuchsin NB TM, parafuchsin, Patent Blue TM, Irgalith Blue TNC TM, Phloxin B TM, fluorescein sodium salt, Rhodamine B base TM, Eosin Scarlet, Eosin Yellowish TM, Erythrosin extra bluish, 4,5-dibromo fluorescein, ethyleosin, Phloxine TM, Cyanovin B TM, chlorocresol green, pinacyanol bromide, 2-(p-dimethylaminostyrl)-1-ethyl pyridinium iodide, ethyl red, nigrosine, Savinyl Blue B TM, Orasol Blue BLN TM, Safranin O TM, Azocarnun G TM, Phenosafranine TM, Azocarmine BX TM, Solophenyl Brilliant Blue BL TM, Nile Blue A TM, gallocyanine, gallamine blue, celestine blue, methylene green, Azure A/B/C TM, Blue VIF Organol TM, Alizarin, Nitrofast Green GSB TM, quinalizarine, Oil Blue N TM, Solvay purple, Ciba Blue TM, Indigo synthetic TM, Chromophthal Bordeaux RS TM, Acid Alizarin Red B TM, 5-Aminofluorescein, Rose Bengal TM, Martius Yellow TM, Chicago Blue 6B TM, Alcian Blue 8GX TM, cresyl violet, 4,4'Bis (dimethylamino)benzylhydrol, Zinc Pthalocyanine, Sudan III TM, Pyronin Y TM, Toluylene Blue TM, cresyl violet perchlorate, Mendola's Blue TM, Phosphine Dye TM, Nitron TM, cresyl violet acetate, Ceres Orange R TM, 4-phenylazo-1-naphtylamine, 4-(4-dimethylamino-1-naptylazo)-3-methoxybenzene sulfonic acid, Bindschedler's Green TM, and p-(p-dimethylaminophenylazo)benzoic acid;

(2) a binary mixture of:
(A) one or more of a Group I body of compounds soluble in said solvent consisting of the halogenated sulfonphthaleins and the organic acids having a $pK_1$ less than about four; and
(B) one or more of a Group II body of compounds consisting of the aminotriphenylmethanes and their soluble salts, 8-hydroxyquinoline, and the cyanines;

wherein the weight ratio of the Group I body of compounds to the Group II body of compounds is more than or about 3 to 1 and with the proviso that if the Group II compounds consist solely of one or more aminotriphenylmethanes or their soluble salts, then the Group I compound must be selected from one or more of the group consisting of oxalic acid, suitable soluble sulfonic acids, and the tetrahalogenated sulfonphthaleins, and the other organic acids having a $pK_1$ of less than or about 2, and (3) one or more of the aforesaid Group III body of compounds with one or more of the Group I or Group II bodies of compounds. Preferably, the Group I body of compounds are one or more of the group consisting of oxalic acid, bromophenyl blue, bromothymol blue, chlorophenol red, bromochlorophenyl blue, bromocresol green, 3,4,5,6-tetrabromophenolsulfonphthalein, 2-naphthalene-sulfonic acid, trichloroacetic acid, chloroanilic acid, bromophenol red, and chlorocresol green, and the Group II body of compounds are preferably one or more of the group consisting of ethyl red, crystal violet, pararosaniline, pararosaniline acetate, 3-ethyl-2-[5-(3-ethyl-2-benzothiazolinylidene)-1,3-pentadienyl]-benzothiazolium iodide, basic fuchsin, 8-hydroxyquinoline, ethyl violet, brilliant green, dicyanine A, pinacyanol chloride, 2-(p-dimethylaminostyryl)-1-ethylpyridinium iodide, 3,3'-diethylthiodicarbocyanine iodide, cryptocyanine, and 5-(p-dimethylamino benzilidine)rhodanine. Most preferably, if a Group I compound is used, it is selected from the halogenated sulfonphthaleins having a $pK_1$ of about 2 and a $pK_2$ of about 7 to about 9. Regardless, the total amount of organic moieties of Groups I-II selected is from about 0.025 to about 0.05 percent of the total weight of the solvent and the soluble organic moieties. Preferably, the solvent is selected from one or more of the group consisting of ortho-chloronitrobenzene, ortho-bromonitrobenzene, 1-thymol, 2-naphthol, 2-ethoxybenzamide and naphthalene. If the human clinical temperature range is to be measured, the predetermined temperature is generally between 96° F. and 105° F., and the thermometer should be constructed to have pockets containing NTICM measuring temperatures at 0.2° F. intervals. This can be accomplished by having a solvent that is preferably a binary mixture of ortho-chloronitrobenzene and ortho-bromonitrobenzene having a proportion of ortho-chloronitrobenzene (OCNB) to ortho-bromonitrobenzene (OBNB) of about 43.8:56.2 to about 4.0:96.0. Most preferably, an OCNB-OBNB system is used with the organic Group III moiety pinacyanol iodide, ideally present in an amount of 0.035 weight percent of the entire OCNB-OBNB composition.

As an alternative to using $CO_2$ above to manufacture cavities, each having full dots of color display, each thermally responsive composition of matter comprises:

(a) a suitable heat-sensitive composition capable of changing color at a predetermined temperature;

(b) a suitable matrix-forming material that is more crystalline than said matrix-forming amorphous material.

Most preferably, it will further comprise a solubilizing compound. A preferably matrix-forming amorphous material is polyisobutylene. A preferably film-forming material may be selected from the group consisting of paraffin wax and low molecular weight polyethylene. The solubilizing compound is preferably chosen from the alcohols having the formula $C_nH_{2n+1}OH$, wherein n is in the range of 18 to 24. An excellent alcohol is docosanol (blow). These materials can be blended in with the NTICM in the manner described in Ser. No. 104,411 now U.S. Pat. No. 4,299,727, incorporated herein.

Such a preferable HSTICM composition consists essentially of: (a) a suitable heat-sensitive composition is substantially free of impurities and consists essentially of an effective NTICM composition containing an effective amount of pinacyanol iodide in a solvent consisting of ortho-chloronitrobenzene and ortho-bromonitrobenzene; (b) the suitable matrix-forming amorphous material is polyisobutylene; (c) the suitable film-forming material is HISTOWAX® HX482 (Matheson, Coleman & Bell, Rutherford, N.J.); and (d) the suitable solubilizer is docosanol ($C_{22}H_{46}O$ by Fluka through Tridon Chemicals, Hauppauge, N.Y.), and weight ratio of (a):(b):(c):(d) is approximately 48:26:5:21, respectfully.

Although the invention has been described with reference to specific embodiments above, numerous variations and modifications will become evident to those skilled in the art without departing from the scope and spirit of the invention described above, defined in the appended claims, and as shown in the following Examples.

EXAMPLE 1

In this example, a thermometer is constructed utilizing the talc in PIB adhesive concept.

A PIB solution is prepared according to the following formulation:

| | |
|---|---|
| OPPANOL® B-15 (BASF Wyandotte Corp., Holland Michigan) | 70 phr |
| OPPANOL® B-50 (again, BASF Wyandotte) | 15 phr |
| CHEVRON POLYBUTENE 122 TM (from S & S Chemical Co., 445 Northern Boulevard, Great Neck, N.Y. 11021) | 15 phr |
| Talc (from Whittaker, Clark & Daniels, Inc., 1000 Coolidge St., South Plainfield, N.J. 07080, #399 Magnesium Silicate) | 3.0 phr |
| Solvent (Heptane) (from Dooner & Smith, 374 Mulberry Street, Newark, N.J.) | q.s. (quantum sufficient) |

Figure 2:
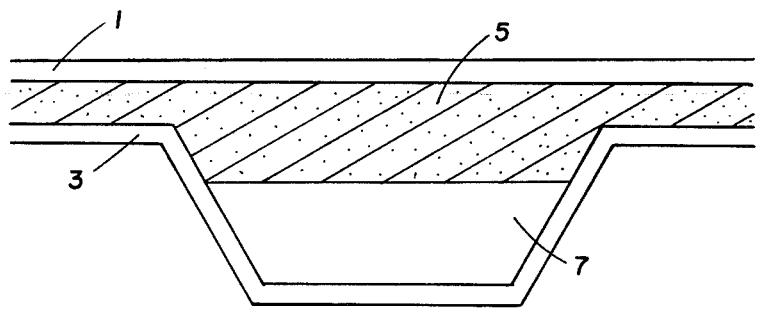
FIG. 2 is a vertical section (not scaled) of a disposable clinical thermometer, for use in Examples 1–2, employing the novel adhesive composition of matter of the instant invention in conjunction with the temperature-indicating compositions of matter of U.S. Pat. No. 4,232,552.

The PIB resins in the above formulation were swelled and dissolved in heptane and blended together. Then the talc was dispersed in the PIB solution with a standard mechanical propeller type mixer known to those in the art. Referring to FIG. 2, this adhesive solution 5 was then applied using a doctor blade to the polyethylene side of a cover layer film 1 composite consisting of 48 gauge (0.00048") MYLAR TM polyester extrusion (Wraps Inc., 810 Springdale Avenue, East Orange, N.J. 07017) coated with 0.001 inch of low density polyethylene (Wraps, Inc., 810 Springdale Avenue, East Orange, N.J.), via a nitrogenous melamine adhesive (e.g., AQUA-FORTE TM 108 by A. D. M. Tronics, 53 Ludlow Ave., Northvale, N.J.). The adhesive coating was allowed to dry until substantially all of the heptane had evaporated. This composition constitutes the talc/PIB adhesive tape.

Again referring to FIG. 2, a carrier film 3 composition consisting of 0.0060–0.0065 inches of PETRA® AW (Allied Chemical Co., Morristown, N.J.) bonded to a Pierson Industries (Holliston, Mass.) composite coextrusion of 0.001 inch of Nylon 6 middle sublayer; Allied Chemical's CAPRAN® 77C) to 0.002 inch SURLYN® 1652 ionomer resin (upper sublayer; DuPont) manufactured in the same way as the thermometer base material according to Example 1 of Ser. No.

113,142 now U.S. Pat. No. 4,345,470, incorporated herein. This base material was processed on a standard thermometer web line and was embossed with matrices of pockets and the pockets filled with a 0.035 wt. percent pinacyanol iodide in a solvent OCNB:OBNB comprising a novel composition of matter 7, as taught in U.S. Pat. No. 4,232,552.

The talc/PIB adhesive tape was applied to seal the thermometer matrix pockets during which process carbon dioxide flushing was used. The thermometers so made were aged at 120° F. for about 6 hours and placed at various conditions to observe the recrystallization of the thermometer chemicals. The following results were obtained:

(1) At 10° F., all of the thermometers had completely recrystallized with one hour.

(2) At 40° F., all of the thermometers had recrystallized within 18 hours.

After freezing and additional storage at room temperature, these thermometers were evaluated for after bath raading retention. In this test, thermometers are placed into stirred water baths at 98.6° F. and 104° F. for 60 seconds. After removing the thermometers from the water baths, they are observed for recrystallization. The results of this testing show good reading retention in that 5% or fewer of the thermometers tested have one dot recrystallized while no thermometers show more than one dot recrystallized.

EXAMPLE 2

In this example, thermometers were prepared in exactly the same manner as in Example 1, except that the talc added to the PIB adhesive solution was at a reduced level, 1.0 phr.

Testing for recrystallization gave the following results:

(1) At 10° F., all thermometers were recrystallized within one hour.

(2) At 40° F., between 7 to 14 days were required to obtain complete recrystallization.

(3) Reading retention testing indicated that these particular thermometers were able to maintain the 5% or less recrystallized thermometers level for 5 minutes post bath.

EXAMPLE 3

Figure 4:
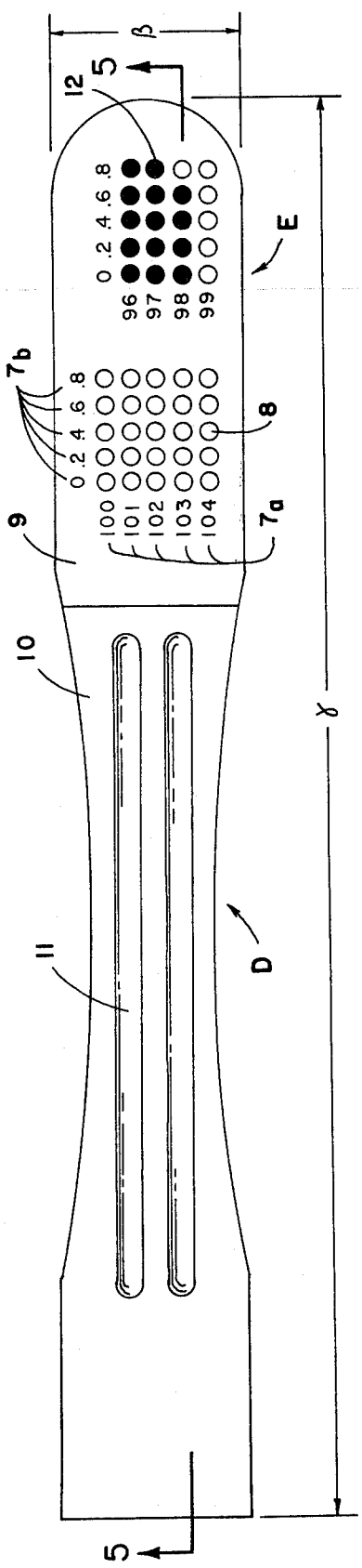
FIG. 4 depicts a novel non-metallic disposable thermometer from above.
Figure 5:
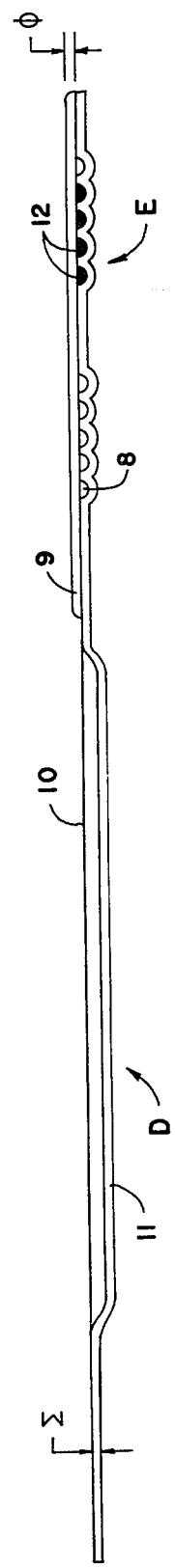
FIG. 5 depicts by horizontal view the same novel thermometer along lines 5—5 of FIG. 4.

FIGS. 4 and 5 represent an overall view of a preferred thermometer according to the invention. The cover layer has an overall thickness of $\phi$, including the novel adhesive composition of the instant invention. The carrier or substrate layer has an overall thickness $\Sigma$. Studying FIGS. 4 and 5, one sees a grid of pockets 8 in flat portion 9 in two sets comprising pocket area E of the thermometer, each identified by columns 7b, each marked "0.0", "0.2", "0.4", "0.6" or "0.8", and by rows 7a, each marked by an integer from 96 to 104. Each of the pockets 8 is filled with a pinacyanol iodide/OCNB:OBNB composition, which turns color upon melting, from a light brown to a soft blue 12. A handle portion D shows a rib 11 protruding from substrate layer 10. The substrate layer 10 has an overall thickness $\Sigma$ of no more than 0.010–0.015 inch, preferably about 0.0008–0.0095 inch, while the sealing layer 9 has an overall thickness preferably of about 0.003 to about 0.004 inches. The thermometer has an overall length of about 3.5 inches and an overall width of about 0.3 inches.

Figure 3:
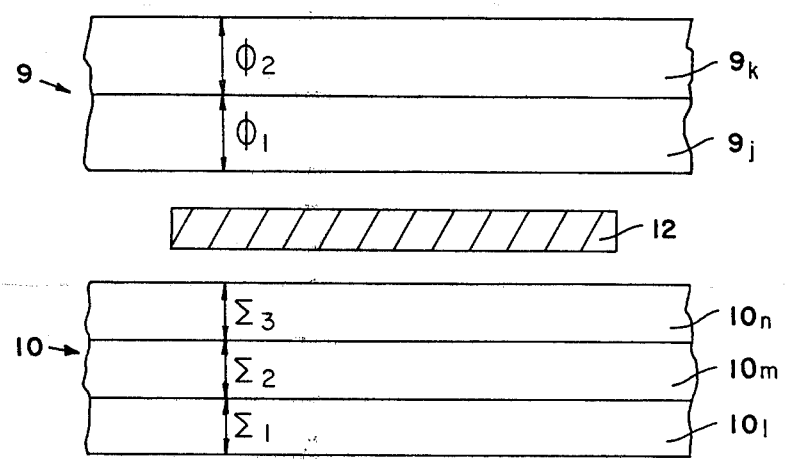
FIG. 3 illustrates various layers (not drawn to scale) of a preferred embodiment of the invention, for use in Examples 3–4, in conjunction with a plastic thermometer as described and claimed in U.S. Ser. No. 113,142, now U.S. Pat. No. 4,345,470.

In FIG. 3, one embodiment, substrate layer 10 comprises a bottom sublayer 10l of PETRA ® AW (having a thickness $\Sigma$, of 0.006–0.0065), adjacent to an intermediate pressure-sensitive acrylic adhesive sublayer 10m (AROSET ™ 1085 Z-45 by Ashland Chemicals, Columbus, Ohio) having a thickness $\Sigma_2$ of 0.0005–0.002 inch. The adhesive is adjacent to a Nylon 6 top sublayer 10n having a thickness $\Sigma$, of 0.002 inch.

The sealing layer 9 has the same Nylon 6 upper sublayer 9k with the same thickness $\phi_2$ of 0.002 inch as Example 3; the bottom sublayer 9j is the same PIB blend as Example 1, having a thickness $\phi_1$ of 0.0012–0.0015 inch.

Referring to FIGS. 4 and 5 again, the temperature numbers 7a, 7b are printed on the PETRA ® AW sublayer 10l. The acrylic adhesive 10m is first placed on the Nylon 6 sublayer 10n by a standard coating (may be performed by Gravure Flex, 100 Wesley Street, South Hackensack, N.J. 07606). Composite layers 10n–10m are bonded to the PETRA ® AW sublayer 10l by the pressure sensitive adhesive 10m. The substrate layer 10 is embossed with the cavities, filled with pinacyanol iodide/OCNB:OBNB NTICM, and frozen in the normal manner. Afterwards, the substrate layer 10 and the sealant layer 9 are laminated with $CO_2$ injected at the point of lamination, and a rib 11 (FIGS. 4–5 embossed in the handle portion "D" (FIGS. 5–6) composed of the extended substrate layer. The thermometers are then cut in the normal fashion.

EXAMPLE 4

In a preferred alternate to Example 6, layer 10n may be made of a 2-layer composite, such as nylon/polyethylene or nylon/SURLYN ®. The two layers may be adhesively bonded by a typical urethane adhesive (DURO-FLEX ™ 25) or they may be coextrusions such as Pierson Industries' Nylon 6/SURLYN ® 1652 coextrusion.

Again referring to FIG. 13, substrate layer 10 comprises a bottom layer 10l of PETRA ® AW (again having a thickness $\Sigma_1$ of 0.006–0.0065 inch), adjacent to an intermediate pressure sensitive adhesive sublayer 10m having a thickness $\Sigma_2$ of 0.0005–0.001 inch. The adhesive is adjacent to the Nylon 6 sublayer of 10n having a thickness $\Sigma_3$ of 0.001–0.002 inch. The polyethylene or SURLYN ® sublayer of 10n has a thickness of 0.001 inch to 0.002 inch. The polyethylene or SURLYN ® layer constitutes the uppermost surface of substrate layer 10.

The sealing layer 9 has an upper substrate layer 9k consisting of (1) biaxially oriented polyester (MYLAR ® type A, DuPont, Wilmington, Del.) with a thickness $\phi_2$ of 0.00048 inch, bonded to (2) 0.001 inch of low density polyethylene. The novel adhesive composition 9j consists of 3.0 phr talc in OPPANOL ™ B-50; CHEVRON POLYBUTENE 122 ™ having a weight ratio of 70 phr:15 phr, respectively. We prefer to heat the coated PIB solution during tape manufacture until substantially all of the solvent is removed-usually at 280° F.–300° F. for about 2 minutes. We use 285° F. for 2 minutes.

As usual, the temperature numbers 7a, 7b are printed on the PETRA ® AW sublayer 10l. The pressure sensitive adhesive layer 10m is first applied to the Nylon 6 surface of sublayer 10n by standard coating method. Composite layers 10n–10m are bonded to the PETRA ® AW sublayer 10l by the pressure sensitive adhesive layer 10m using standard lamination technique, taking care to avoid the inclusion of air pockets between layers 10m and 10l. The substrate layer is embossed with the carvities, filled with the NTICM and frozen in a normal manner. Afterwards, the substrate layer 10 and the sealant layer are laminated with $CO_2$ injected at the point of combination such that the free volume of each pocket is substantially filled with $CO_2$. Rib 11 (FIGS. 4-5) are embossed in the handle portion "D" (FIGS. 4-5) composed of the extended substrate layer $10l$. In this fashion, the composite layers $10n$–$10m$ are applied only to that portion of substrate $10l$ which bears the printed temperature numbers $7a$ and $7b$. After the thermometer web is made, we prefer to age it at 120° F. for about 6-7 hours to improve the supercooling at room temperature when reading the thermometer. The thermometers are then cut in the normal fashion.

EXAMPLE 5

Figure 6:
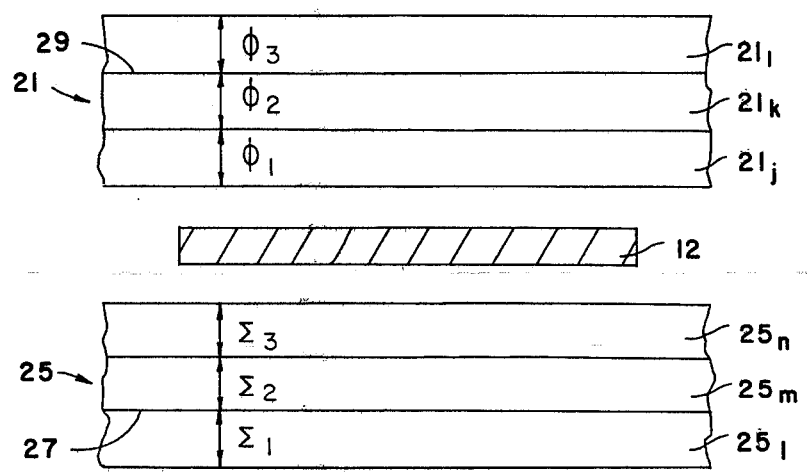
FIG. 6 is a vertical section (not scaled) of still another disposable thermometer, for use in Example 5, employing the novel adhesive composition of matter of the instant invention in conjunction with the temperature-indicating compositions of matter of U.S. Pat. No. 4,232,552.

FIG. 6 shows a cross-section of the layers of our most preferred thermometer, which contains the novel adhesive $21j$ made according to Example 1. Here, the substrate layer 25 comprises three sublayers: a bottom sublayer $25l$ of PETRA ® AW having a thickness $\Sigma_1$ of about 0.006" bonded by a polyurethane laminating adhesive 27 (POLYBOND SN ™ 393C by Polymer Industries, Springdale, Conn.) to a coextrusion of $25m$ Nylon 6 (Allied Chemicals, Morristown, N.J.) of thickness $\Sigma_2$ 0.001" bonded to SURLYN 1650 or 1652 ® $25n$ top sublayer of 0.002 $\Sigma_3$. A NTICM of 0.035 wt. percent pinacyanol iodide in OCNB:OBNB is employed as the temperature indicating composition of matter 12. The cover layer comprises also three sublayers: (1) $21l$ of MYLAR ® type A by DuPont ($\phi_3 = 0.00048"$) bonded 29 (POLAQUA ™ 103 or AQUA-FORTE ® 108, A. D. M. Tronics, Northvale, N.J.) to (2) a 0.001" $\phi_2$ of low density polyethylene $21k$ (Wraps Inc., 810 Springdale Ave., East Orange, N.J.) to (3) a 0.0012" $\phi_1$ layer of the novel adhesive of Example 1.

As a practical matter, the thermometer is assembled as follows from four composites: Composite #1 comprises the 0.00048" layer of MYLAR ® type A bonded 29 by POLAQUA ® 103 or AQUA-FORTE ® 108 29 of thickness 0.0001" to 0.001" of low density polyethylene $21k$. Composite #1 can be supplied by Wraps, Inc., at the aforementioned address (Wraps, Inc. uses AQUA-FORTE ® 108 in lieu of POLAQUA ® 103). Composite #4 comprises composite #1 bonded to a 0.0012" layer of the novel talc-polyisobutylene compositions of Example 1. Composite #4 is supplied to us by Air-O-Plastic Inc., Edison, N.J.

Composite #2 composite coextrusion $25m$ comprises the SURLYN ® 1650 or SURLYN ® 1652 layer $25n$ (0.002") bonded to the 0.001" layer of Nylon 6 (Allied Chemical Co.), and can be obtained from Pierson Industries, Holliston, Mass. Composite #3 comprises composite #2 bonded by POLYBOND ® 393C (0.0001") 27 to the 0.006" layer of PETRA ® AW $25l$, and can be obtained from Tapecon, Inc., Rochester, N.Y.

The thermometer is manufactured by filling each of the cavities 8 (FIGS. 4-5) of Composite 3 with a NTICM of 0.035 wt. percent pinacyanol iodide in OCNB:OBNB, and bonding same to Composite 4 under a $CO_2$ blanket utilizing rollers which compress layers 3 and 4 together with a bonding pressure of 1 to 50 kg/cm², followed by aging the assembled thermometers at 120° F. for 6-7 hours.

We claim as our invention:

1. A temperature-indicating device, comprising:
   (a) heat-conducting carrier means having at least one spaced region defined therein to determine a like number of predetermined temperatures in a predetermined temperature range, said at least one spaced region containing a like number of different temperature-indicating mixtures therein, each mixture being a solid solution having a given nucleation efficiency and melting at or about one of said predetermined temperatures,
   (b) a transparent cover layer means sealing said heat-conducting carrier means, said spaced regions, and said temperature-indicating mixtures, said transparent cover layer means and said heat-conducting carrier means capable of bonding to each other by adhesive means; and
   (c) adhesive means (i) covering said heat-conducting carrier means, said spaced regions, and said temperature-indicating mixtures and (ii) bonding said heat-conducting carrier means to said transparent cover layer means, said adhesive means comprising:
      (1) from about 0.5 to about 5.0 phr. of a nucleating agent selected from the group consisting of talc, howlite, titanite, Guyana bauxite, Arkansas bauxite, Spanish sepiolite, lepidolite, stilbite, petalite, calcium aluminate, and azurite substantially uniformly dispersed in
      (2) a pressure-sensitive adhesive, said nucleating agent being (A) inert to both said pressure-sensitive adhesive and said temperature-indicating mixtures and (B) capable of raising the nucleation efficiency of said temperature-indicating mixtures.

2. The temperature-indicating device of claim 1, whereby the temperature-sensitive solid mixtures each comprise a composition of matter which changes color sharply upon a transition from a liquid state to a solid state or a solid state to a liquid state capable of being supercooled for at least several minutes.

3. The temperature-indicating device of claim 2, wherein the temperature-sensitive solid mixture each comprises:
   (a) a solvent (I) consisting of a single substance or a mixture of substances and adapted to change from a solid state at substantially a predetermined temperature to a liquid state, and
   (b) an indicator system (II) consisting of one or more substances different from (I), characterized in that:
      (1) (II) is soluble in (I) when the latter is in the liquid phase, and
      (2) the novel composition of matter, including the indicator system (II), changes color visible to the naked eye when (I) passes from the solid to the liquid phase or from the liquid to the solid phase.

4. The temperature-indicating device of claim 1, wherein the suitable pressure-sensitive adhesive is selected from one or more of the group consisting of polyisobutylene, polyvinyl alcohol and a coating resin.

5. The temperature-indicating device of claim 1, wherein the suitable pressure-sensitive adhesive comprises polyisobutylene.

6. The temperature-indicating device of claim 1, wherein the suitable nucleating agent is talc.

7. The temperature-indicating device of claim 1, wherein the suitable nucleating agent is talc, the suitable pressure-sensitive adhesive is polyisobutylene, and the amount of talc in polyisobutylene is from about 0.5 to about 5.0 phr.

8. The temperature-indicating device of claim 7, wherein the pressure-sensitive adhesive consists essentially of a mixture of polyisobutylene having an average molecular weight of 77,000 to 92,000, polyisobutylene having an average molecular weight of 340,000 to 480,000, and polyisobutylene having a viscosity of 3,000 to 3,400 centistokes at 100° C. in a weight ratio of 70 phr:15 phr:15 phr, respectively.

9. The temperature-indicating device of claim 7, wherein the amount of talc in polyisobutylene is about 3.0 phr.

10. The temperature-indicating device of claim 1, wherein each temperature-sensitive solid mixture is substantially free of impurities and consists essentially of a solid solution of:

(a) a binary mixture of ortho-chloronitrobenzene and ortho-bromonitrobenzene having a proportion of ortho-chloronitrobenzene to ortho-bromonitrobenzene of about 43.8:56.2 to about 4.0:96.0; and (b) an effective amount of a pinacyanol iodide soluble in and inert towards said binary mixture (a) and adapted to change the color of the composition visible to the naked eye upon a change in state from a solid state to a liquid state at a predetermined temperature.

11. The temperature-indicating device of claim 10, wherein the amount of pinacyanol iodide employed is about 0.035 weight percent of the entire solid solution.

* * * * *